(12) United States Patent
Shechtman et al.

(10) Patent No.: US 10,332,291 B2
(45) Date of Patent: *Jun. 25, 2019

(54) CONTENT AWARE IMAGE EDITING

(71) Applicant: Adobe Inc., San Jose, CA (US)

(72) Inventors: Elya Shechtman, Seattle, WA (US); Dan Goldman, Seattle, WA (US)

(73) Assignee: Adobe Inc., San Jose, CA (US)

(*) Notice: Subject to any disclaimer, the term of this patent is extended or adjusted under 35 U.S.C. 154(b) by 78 days.

This patent is subject to a terminal disclaimer.

(21) Appl. No.: 15/398,153

(22) Filed: Jan. 4, 2017

(65) Prior Publication Data
US 2017/0116769 A1    Apr. 27, 2017

Related U.S. Application Data

(63) Continuation of application No. 13/740,814, filed on Jan. 14, 2013, now Pat. No. 9,575,641.

(60) Provisional application No. 61/613,284, filed on Mar. 20, 2012.

(51) Int. Cl.
| | |
|---|---|
| *G06T 11/60* | (2006.01) |
| *G06F 3/0484* | (2013.01) |
| *G06T 5/00* | (2006.01) |
| *G06T 7/90* | (2017.01) |
| *G06F 3/0486* | (2013.01) |

(52) U.S. Cl.
CPC ............ *G06T 11/60* (2013.01); *G06F 3/0486* (2013.01); *G06F 3/04842* (2013.01); *G06F 3/04845* (2013.01); *G06T 5/005* (2013.01); *G06T 7/90* (2017.01); *G06T 2207/10004* (2013.01); *G06T 2207/10024* (2013.01); *G06T 2207/20104* (2013.01)

(58) Field of Classification Search
CPC .... G06F 3/0481; G06F 9/4443; G06F 3/0482; G06F 3/04847; G06Q 10/10; G06T 11/60; G06T 11/80; G06T 11/001
See application file for complete search history.

(56) References Cited

U.S. PATENT DOCUMENTS

| | | | | |
|---|---|---|---|---|
| 5,659,490 | A * | 8/1997 | Imamura | G06T 11/001 345/589 |
| 5,986,670 | A * | 11/1999 | Dries | G06F 17/5004 345/629 |
| 8,139,083 | B2 * | 3/2012 | de Leon | H04N 1/00183 345/619 |
| 2003/0151674 | A1 * | 8/2003 | Lin | G06K 9/036 348/222.1 |

(Continued)

*Primary Examiner* — Mandrita Brahmachari
(74) *Attorney, Agent, or Firm* — Kilpatrick Townsend & Stockton LLP

(57) ABSTRACT

An image is displayed using a computer system. The image includes contents that have a visible feature therein at a first location. A first input is received that includes a user movement of at least the visible feature from the first location. During the user movement, the first location is synthesized with content from where the visible feature is currently located. A second input is received that specifies an end of the user movement at a second location. A source area in the image is identified. The method further includes identifying additional contents within the source area. The additional contents are identified using a patch-based optimization algorithm on the image. The method further includes updating the image to have the additional contents at least in the first location.

20 Claims, 21 Drawing Sheets

(56) References Cited

U.S. PATENT DOCUMENTS

| | | | |
|---|---|---|---|
| 2007/0147700 A1* | 6/2007 | Jeong | G06T 11/60 382/266 |
| 2007/0297672 A1* | 12/2007 | Eschbach | H04N 1/3871 382/173 |
| 2008/0199083 A1* | 8/2008 | Chen | G06K 9/209 382/203 |
| 2010/0183243 A1* | 7/2010 | Brand | G06T 3/0093 382/282 |
| 2010/0296748 A1* | 11/2010 | Shechtman | G06T 11/00 382/254 |
| 2011/0193993 A1* | 8/2011 | Yeom | H04N 5/232 348/231.3 |
| 2012/0155773 A1* | 6/2012 | Tsukamoto | H04N 1/00286 382/190 |
| 2012/0195501 A1* | 8/2012 | Oh | G06T 9/00 382/164 |
| 2012/0210274 A1* | 8/2012 | Pettigrew | G09G 5/02 715/810 |
| 2013/0089258 A1* | 4/2013 | Herling | G06K 9/00771 382/173 |
| 2013/0094780 A1* | 4/2013 | Tang | G06T 11/60 382/284 |

* cited by examiner

CONTENT AWARE IMAGE EDITING

CROSS-REFERENCE TO RELATED APPLICATION

This application is a continuation application of U.S. patent application Ser. No. 13/740,814 filed on Jan. 14, 2013, which claims the benefit of U.S. Provisional Application No. 61/613,284 filed on Mar. 20, 2012, the contents of which are incorporated herein by reference.

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

BACKGROUND

This specification relates to digital image processing.

Some existing image processing techniques use patch-based techniques for manipulating content. The processing can involve analyzing or synthesizing patches (e.g., pixel groups) of image content. For example, patch-based approaches are used in denoising image and video content; enhancing image resolution such as performing super-resolution; compressing image content; changing image aspect ratio such as by retargeting; reshuffling of image content; stitching images together; editing image content; and performing texture synthesis. Patch-based methods can have benefits for synthesis operations. For example, structure, texture, repetitive patterns and redundancies can be treated.

Techniques have been tried for completing images in different ways, and they can rely on patch-based techniques. For example, synthesis techniques exist that attempt to find content for a hole in an image by analyzing content elsewhere in the image. Cloning techniques exist where a user manually can select a source region which is then cloned to a target region to synthesize the contents of the hole.

SUMMARY

This specification describes technologies relating to image modification.

In one aspect, a computer-implemented method modifies an image. The method includes displaying an image using a computer system, the image includes contents that have a visible feature therein at a first location. The method further includes receiving a first input that includes a user movement of at least the visible feature from the first location. The method further includes synthesizing, during the user movement, the first location with content from where the visible feature is currently located. The method further includes receiving a second input that specifies an end of the user movement at a second location. The method further includes identifying a source area in the image that includes at least the second location and an area around the first location. The method further includes identifying additional contents for at least the first location within the source area, the additional contents identified using a patch-based optimization algorithm on the image. The method further includes updating the image to have the additional contents at least in the first location.

Implementations can include any, all, or none of the following features. The first location, after the first input is received, includes a hole in the image and the updated image is generated in a hole-synthesizing process. Updating the image includes deleting the visible feature from the first location. The image is updated to have at least part of the additional contents in the area around the first location. The method further includes generating a source mask for the image having a first color for the source area and a second color for the rest of the source mask. The method further includes identifying a synthesis area in the image that includes the first location. The method further includes generating a synthesis mask for the image having a first color for the synthesis area and a second color for the rest of the synthesis mask. The method further includes storing the updated image to a computer-readable storage device.

In one aspect, a computer-implemented method modifies an image. The method includes displaying an image using a computer system. The image includes contents that have a visible feature therein at a first location. The method further includes receiving a first input that includes a user movement of at least the visible feature from the first location. The method further includes synthesizing, during the user movement, the first location with content from where the visible feature is currently located. The method further includes receiving a second input that specifies an end of the user movement at a second location. The method further includes identifying a source area in the image that includes at least the first location, the second location, an area around the first location, and an area around the second location. The method further includes identifying a synthesis area that includes the second location. The method further includes identifying additional contents for the synthesis area within the source area, the additional contents identified using a patch-based optimization algorithm on the image. The method further includes updating the image to have the additional contents Implementations can include any, all, or none of the following features. The updated image is generated in an extend process in which the visible feature is extended from a first appearance to a second appearance. The method includes updating the image to have the visible feature in the second location. The first location and the second location do not overlap. The synthesis area includes the second location with an interior portion removed therefrom.

In one aspect, a computer-implemented method for modifying an image. The method includes displaying an image using a computer system, the image includes contents that have a visible feature therein at a first location. The method further includes receiving a first input that includes a user movement of at least the visible feature from the first location. The method further includes synthesizing, during the user movement, the first location with content from where the visible feature is currently located. The method further includes receiving a second input that specifies an end of the user movement at a second location. The method further includes identifying a source area in the image that includes at least the first location, the second location, an area around the first location, and an area around the second location. The method further includes identifying a synthesis area that includes at least a portion of the first location and at least a portion of the second location. The method further includes identifying additional contents for at the synthesis area within the source area, the additional contents identified using a patch-based optimization algorithm on the image. The method further includes updating the image to have the additional contents at least in the synthesis area.

Implementations can include any, all, or none of the following features. The updated image is generated in an extend process in which the visible feature is extended from a first appearance to a second appearance. The first location and the second location overlap. The updated image is generated in a move process in which the visible feature is moved from the first location to the second location. The source area does not include the synthesis area.

In one aspect, a computer-readable medium has stored therein instructions that, when executed, performing a method for modifying an image. The method includes displaying an image using a computer system, the image includes contents that have a visible feature therein at a first location. The method further includes receiving a first input that includes a user movement of at least the visible feature from the first location. The method further includes synthesizing, during the user movement, the first location with content from where the visible feature is currently located. The method further includes receiving a second input that specifies an end of the user movement at a second location. The method further includes identifying a source area in the image that includes at least the second location and an area around the first location. The method further includes identifying additional contents for at least the first location within the source area, the additional contents identified using a patch-based optimization algorithm on the image. The method further includes updating the image to have the additional contents at least in the first location.

Implementations can include the following feature. The method further includes identifying a synthesis area in the image that includes the first location.

In one aspect, a system one or more processors.

The processors are configured to provide, to an output device, an image comprising contents that have a visible feature therein at a first location. The processors are further configured to receive, from an input device, a first input comprising a user movement of at least the visible feature from the first location. The processors are further configured to synthesize, during the user movement, the first location with content from where the visible feature is currently located. The processors are further configured to receive a second user input that specifies an end of the user movement at a second location.

The processors are further configured to identify a source area in the image that includes at least the second location and an area around the first location.

The processors are further configured to identify additional contents for at least the first location within the source area, the additional contents identified using a patch-based optimization algorithm on the image.

The processors are configured to provide, to the output device, an update to the image having the additional contents at least in the first location.

Particular embodiments of the subject matter described in this specification can be implemented so as to realize one or more of the following advantages. Image editing can be improved. A user can create a synthesis area of an arbitrary shape and specify source content in the same shape to be used in a content aware synthesize operation. A user can select a visible feature to edit with wide and/or rough margins. A novice user that is unable to select a visible feature with tight and/or accurate selections may use a content aware synthesize operation. Manual retouching and selection work in image editing can be automated. Content can be used to synthesize large holes in an image. A user can control the content used to synthesize a hole The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Image manipulation techniques, such as content moving, content stretching, and content synthesis for hole-filling, may be performed in an image manipulation software application. The software application may allow, for example, a user to select a command and move a feature of an image. Depending on the command, the software application can create one or more source areas and one or more synthesis areas based on the user movement. Content for the synthesis area can be synthesized from the source area and placed in the synthesis area, creating a modified image that has been edited according to the selected command.

The shape and configuration of the synthesis area and the source area may be different for different types of commands. For example, a user selects a remove command, selects a feature, and drags the feature to a new location. In response, the software application may create source and synthesis areas, based on this movement, that cause content from the source area to be synthesized into new content in the synthesis area, effectively removing the selected feature. The synthesis area in this case could be the selected feature, and the source area could be the new location and an area around the original location of the feature. By way of comparisons, in an extend command in which a feature of an image is modified by extending the feature in one direction, the synthesis area may be, for example, an area between the original location of the feature and the new location of the feature.

Figure 1:
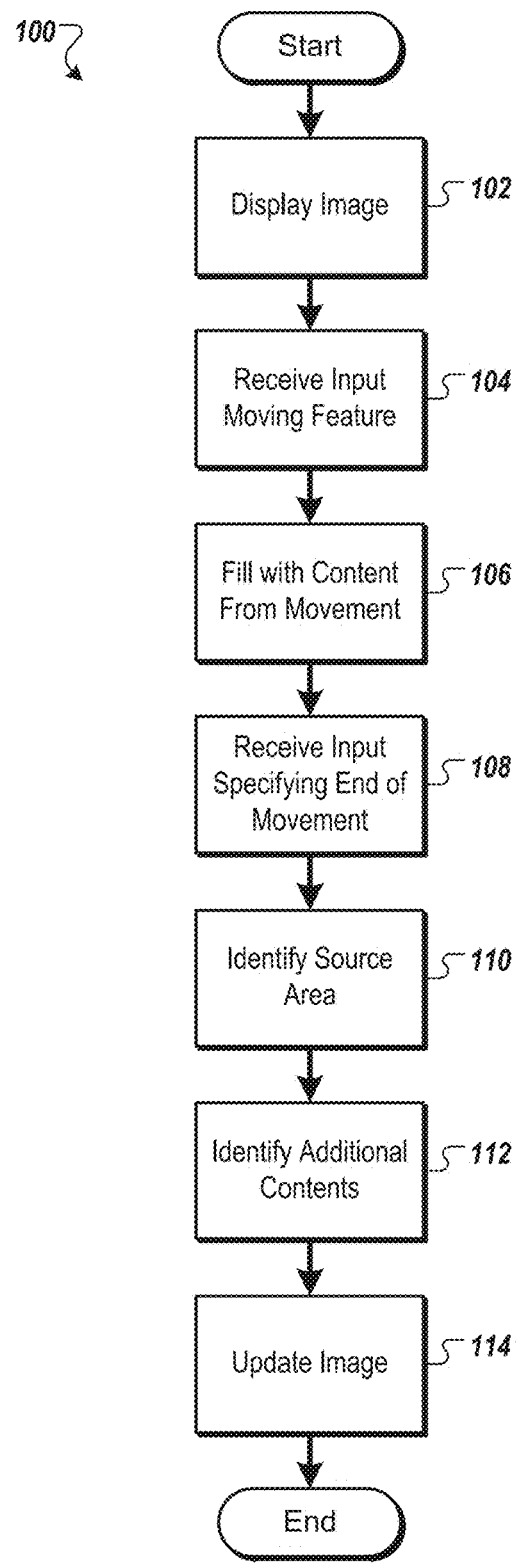
FIG. 1 shows a flowchart of an example process for modifying an image.
Figure 6:
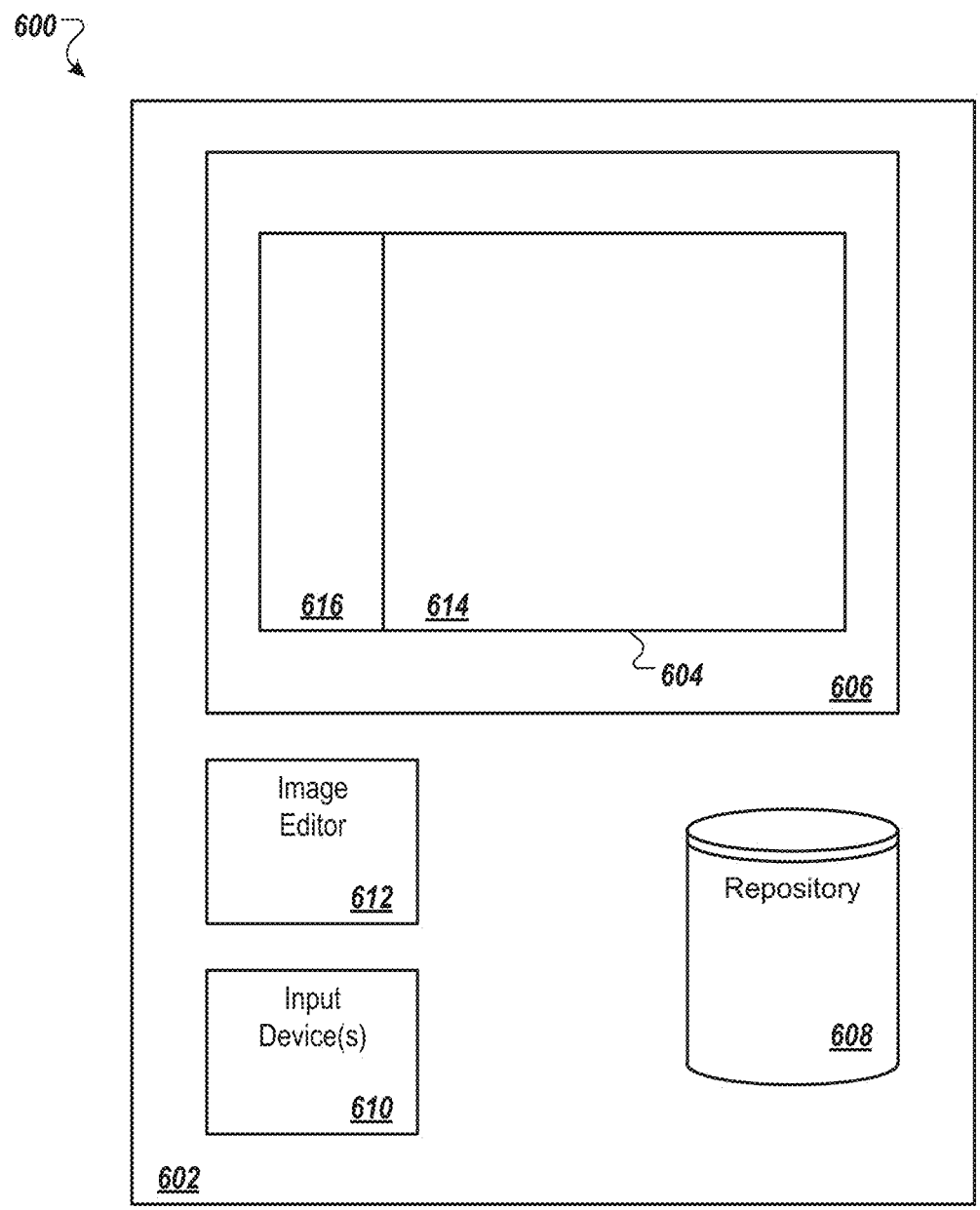
FIG. 6 shows an example system that can generate an updated image.

FIG. 1 shows a flowchart of an example process 100 for modifying an image. The process 100 can be performed by, for example, systems such as the system 600 (FIG. 6, below). Therefore, the description that follows uses a computer system as the basis of an example describing the system for clarity of presentation. However, another system, or combination of systems, may be used to perform the process 100.

An image is displayed (102), using a computer system. The image comprises contents that have a visible feature therein at a first location. For example, the image display area 114 (FIG. 1) may display an image to a user for editing. The image can have some visible content that the user may wish to remove, such as a lens flare artifact or some unsightly or undesirable subject matter (e.g., garbage or a billboard) in a landscape image.

A first input is received (104) that comprises a user movement of at least the visible feature from the first location. For example, the user may select the lens flare with an image editing tool, creating a selection outline. The user may then press and hold a mouse button while moving the mouse. In response, the computer system may move the lens flare content across the image display area 114 in accordance with the mouse movement.

The first location is synthesized (106) with the content from where the visible feature is currently located. For example, as the user moves the lens flare, the original location of the lens flare can be updated based on the content of the image that is currently under the moving lens flare. In some implementations, this update may be performed continuously so that, subject to the hardware limitations of the computer system, the image is continuously updated. Alternatively, the updating may be periodic, such as once or twice a second.

A second input is received (108) that specifies an end of the user movement at a second location. For example, the user may remove his or her finger from the mouse button. The computer system may detect this as, for example, a mouse up event. In response to receiving this input, the computer system may identify the location where the user has moved the lens flare as a second location.

A source area is identified (110) in the image. The source area includes at least the second location and an area around the first location. For example, the computer system may identify an area around the original lens flare, and another area around the second location where the lens flare was moved, as the source area. In some cases, the shape and/or size of one or both of these areas may be altered. For example, the computer system may dilate the second location by adding one or more areas of surrounding pixels to the second location.

Additional contents are identified (112) for at least the first location area, and this identification is performed within the source area. The additional contents are identified using a patch-based optimization algorithm on the image. For example, the computer system may perform a patch-based optimization algorithm substantially as described below (FIG. 6), drawing from the source area that was defined based on the area around the original location of the lens flare and the user identification of the second location. In this example, the additional contents are identified only within the source area. Contents of the rest of the image, outside the source area, may be ignored, skipped, or otherwise excluded from the identification.

The image is updated (114) to include the additional contents at least in the first location area. Updating the image may include deleting the visible feature from the first location. For example, the computer system may display the image with the lens flare removed and replaced by content from the synthesis area. Then, the system can save the image to disk, or transmit the image over a network, to name just a few examples.

In some implementations, the additional contents may be placed beyond the first location area. For example, the additional contents may be feathered into the surrounding contents, or an additional area around the first location may be identified for receiving the additional contents (e.g. if the shape of the first location was enlarged or smoothed).

In some implementations, different commands (e.g. move instead of remove) may result in different source and synthesis areas. Three example commands, along with their corresponding source and synthesis area, are described below (FIGS. 3-5).

Figure 2:
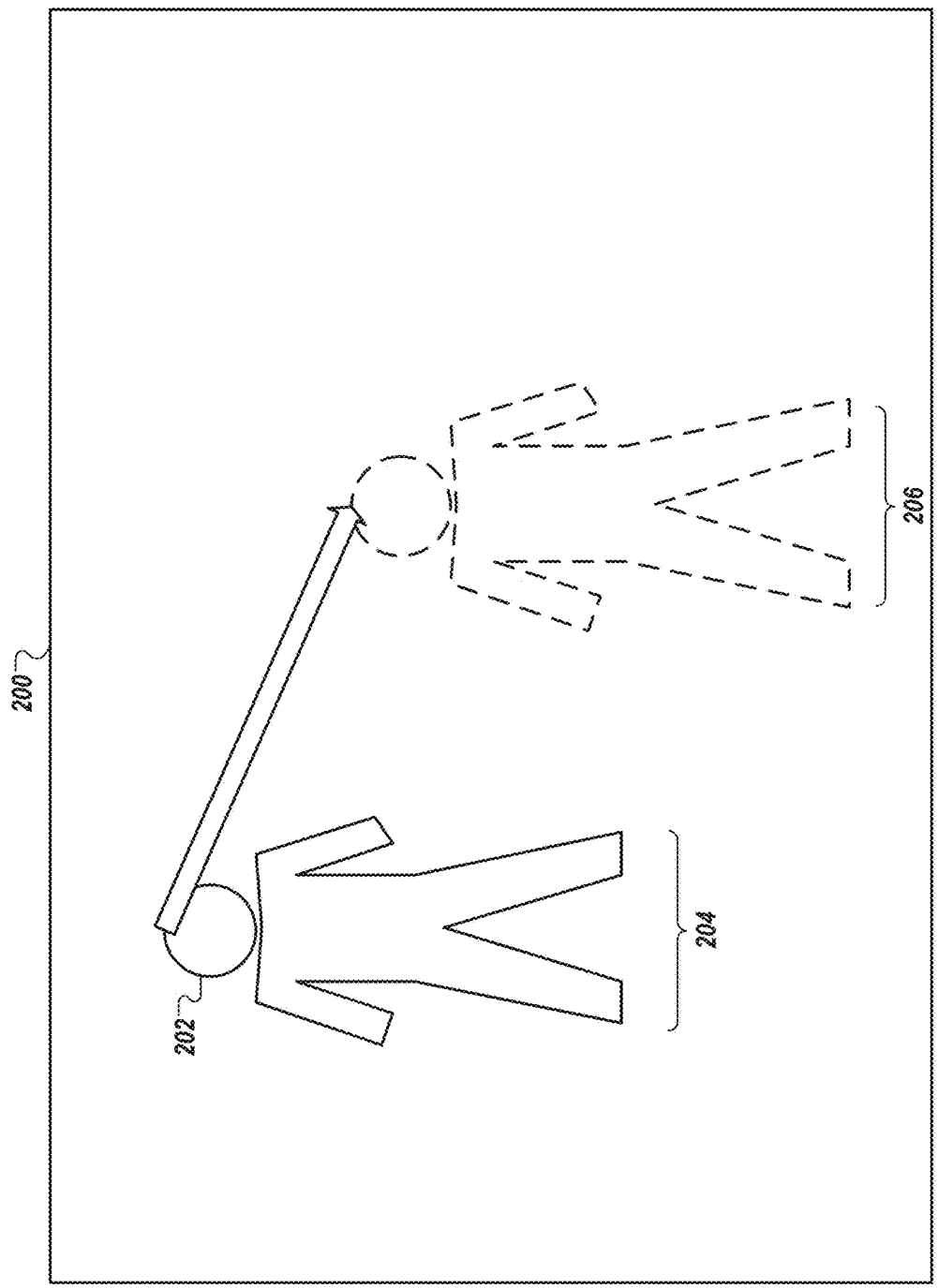
FIG. 2 schematically shows an example of an input that includes a user movement of a visible feature from a first location to a second location.

FIG. 2 schematically shows an example of an input to a graphical user interface (GUI) 200 that includes a user movement of a visible feature from a first location to a second location. In this example, the GUI 200 is displaying an image to the user, and the user has selected a visible feature 202. The nature of the selection may depend on, for example, the configuration of the GUI 200. For example, the GUI 200 may provide the user with a lasso, marquee, or auto-selection tool. The user may use one or more of these tools to select the visible feature 202. It will be understood that in some configurations, the selection of the visible feature 202 may include selection of some of the visible content around the visible feature 202 and may exclude some portions of the visible feature 202. Although a visible feature 202 in the shape of a human is shown in this example, any sort of visible feature in an image may be selected, including, but not limited to, a group of visible features or a portion of a visible feature.

The user may then provide an input that includes moving the visible feature 202 from a first location 204 to a second location 206. In this example, the first location may correspond to the location of the visible feature 202 in an unupdated image. The format of the input may depend on the configuration of the input device(s) 110. For example, a mouse, touchpad, or track pad may provide a dragging input in which the user drags the visible feature 202. A keyboard may provide button press inputs that correspond to directional movements.

In some implementations, this or a similar input can be used in a content-moving image editing process. In this example use, the user may wish to reposition the visible feature 202 within the image display, which creates a hole in the image, and synthesize the hole with suitable content. The user input could be used to reposition the visible feature 202 and to identify a source area from which additional content may be drawn to replace the visible feature 202 in a synthesis area based on the first location 204.

Another example use of the input described here is in a content patching image editing process. In this example use, the user may wish to remove the visible feature 202 and replace the visible feature 202 with other content. The input, then, could be used to identify a source area from which additional content may be drawn to replace the visible feature 202 in a synthesis area based on the first location 204.

Although this description discusses moving the visible feature 202, other configurations may involve moving the visible feature 202 by proxy. That is, the GUI 200 may provide the user with one or more visible elements for the user to move instead of directly moving the visible feature 202. One example of a proxy is a dashed outline that the user may move over the surface of the image instead of moving the visible feature itself.

FIGS. 3A-E show an example of image modifications with a patch tool, such as may be provided by the GUI 200 (FIG. 2). With this tool, a user can select image content to be removed, creating a synthesis area. The user can drag the selection to a desirable second location. This can serve to identify a source area that should roughly replace the image content in the synthesis area. While dragging, the user sees the content from the source area dynamically replacing the synthesis area as an initial guess. Once the user selects the second location, a patch-based optimization algorithm can delete the selected content and identify contents for the synthesis area from within the source area.

Figure 3A:
FIGS. 3A-E show examples of image modifications with a patch tool.

FIG. 3A shows an example image 300 to be modified. The image 300 shows a family and a pair of cars in the background. In this example, the user wishes to remove the cars. The user can select the cars by, for example, drawing an outline around the cars and can input a command to move the selected cars away from the car's original location. This user input selecting and moving the cars creates a synthesis mask for the image 300 that identifies a synthesis area in the image 300.

Figure 3B:
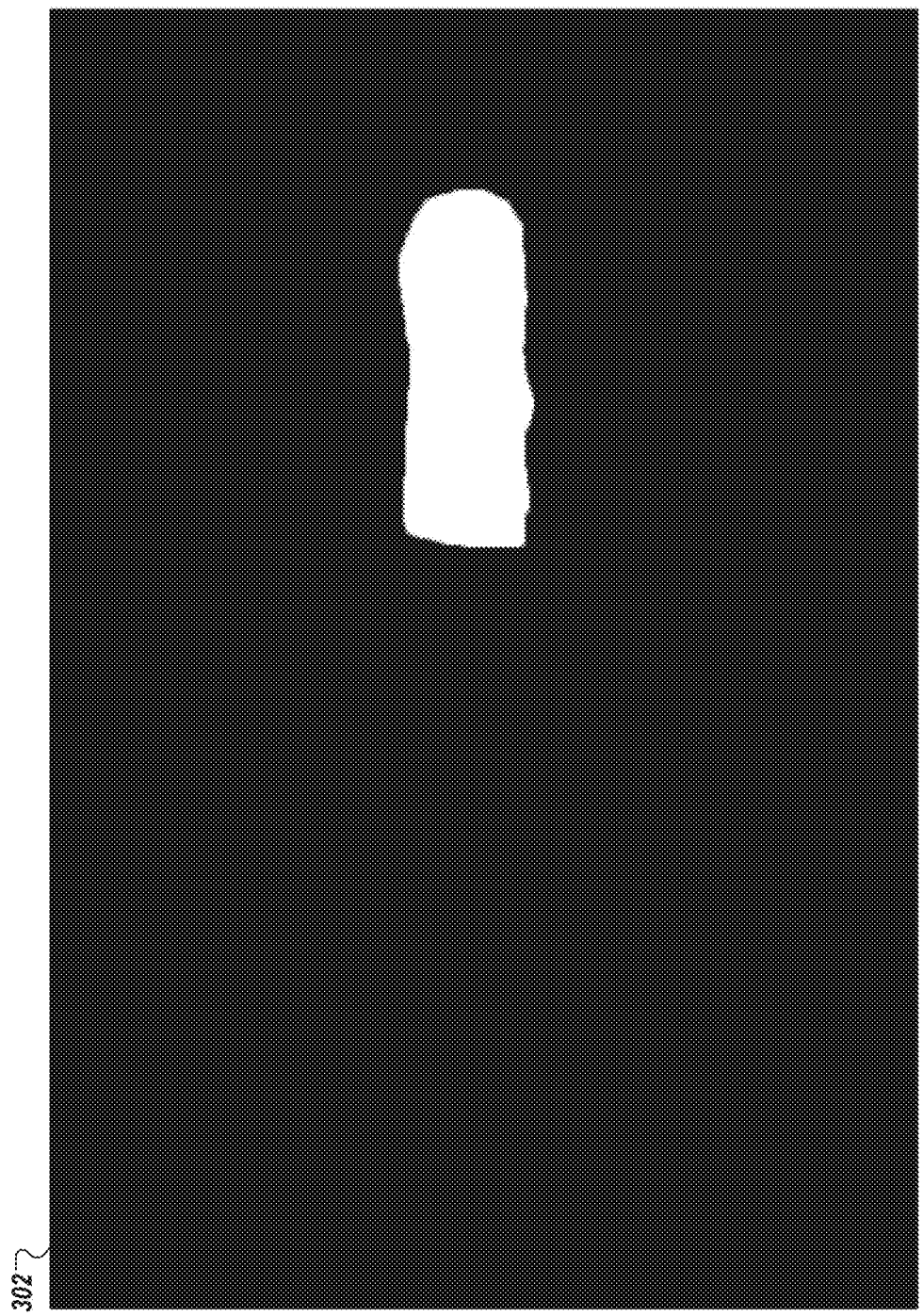

FIG. 3B shows a synthesis mask 302 for the image 300. The synthesis mask 302 may be created and maintained separately from the image 300, may be layered in the same image file as the image 300, or may be a schematic representation of a data structure that is never shown to a user, to name just a few examples. Generally, the synthesis mask 302 here has a white section and a black section. The white section corresponds to a synthesis area in the image 300 to which content should be added to partially or entirely synthesize the contents of the hole created by removing the leftmost person from that area.

The shape of the synthesis area can be created based on the shape of the selection of the cars. In some implementations, the shape of the synthesis area may correspond to the shape of the outline created by the user. In some implementations, the shape of the synthesis area can differ somewhat or substantially from that of the user's selection. For example, a synthesize-adaptation variable may be defined so that the synthesis area is dilated or contracted, relative to the user selection, according to the adaptation variable. For example, the synthesize-adaptation variable may have five states: Very Strict, Strict, Neutral, Loose, and Very Loose. The synthesis area may, for example, be dilated the most for the Very Loose state and not dilated at all for the Very Strict state.

Figure 3C:

FIG. 3C shows an example image 304 with initial content at the first location 306 from a second location 307. In this example, the user drags or otherwise moves the selection from the first location 306 (e.g., from where it surrounds the cars) to a second location 307 in the same or a different image (e.g., to another position on the background). This placement indicates where, in part, to draw source content for synthesizing the contents of the hole created by the relocation. In response to the relocation, a source area is identified based on the second location 307 and content from the source area is dynamically placed in the first location 306.

For example, the initial content shown in the first location 306 was dynamically obtained from the second location 307. The initial content can show to the user a first guess at the content that may be synthesized at the first location 306, enabling the user to decide whether the first guess is sufficient (e.g., to decide whether the second location 307 currently has the types of textures needed for synthesizing the second location 307.) If the user were to move the selection around in the image (or onto another image), this would cause the second location 307 to move with the selection, and the first location 306 to be updated accordingly. That is, the initial content in the first location 306 can change depending on the where the second location 307 is. In some implementations, the first location 306 is updated in real time when the source area is moved.

Figure 3D:
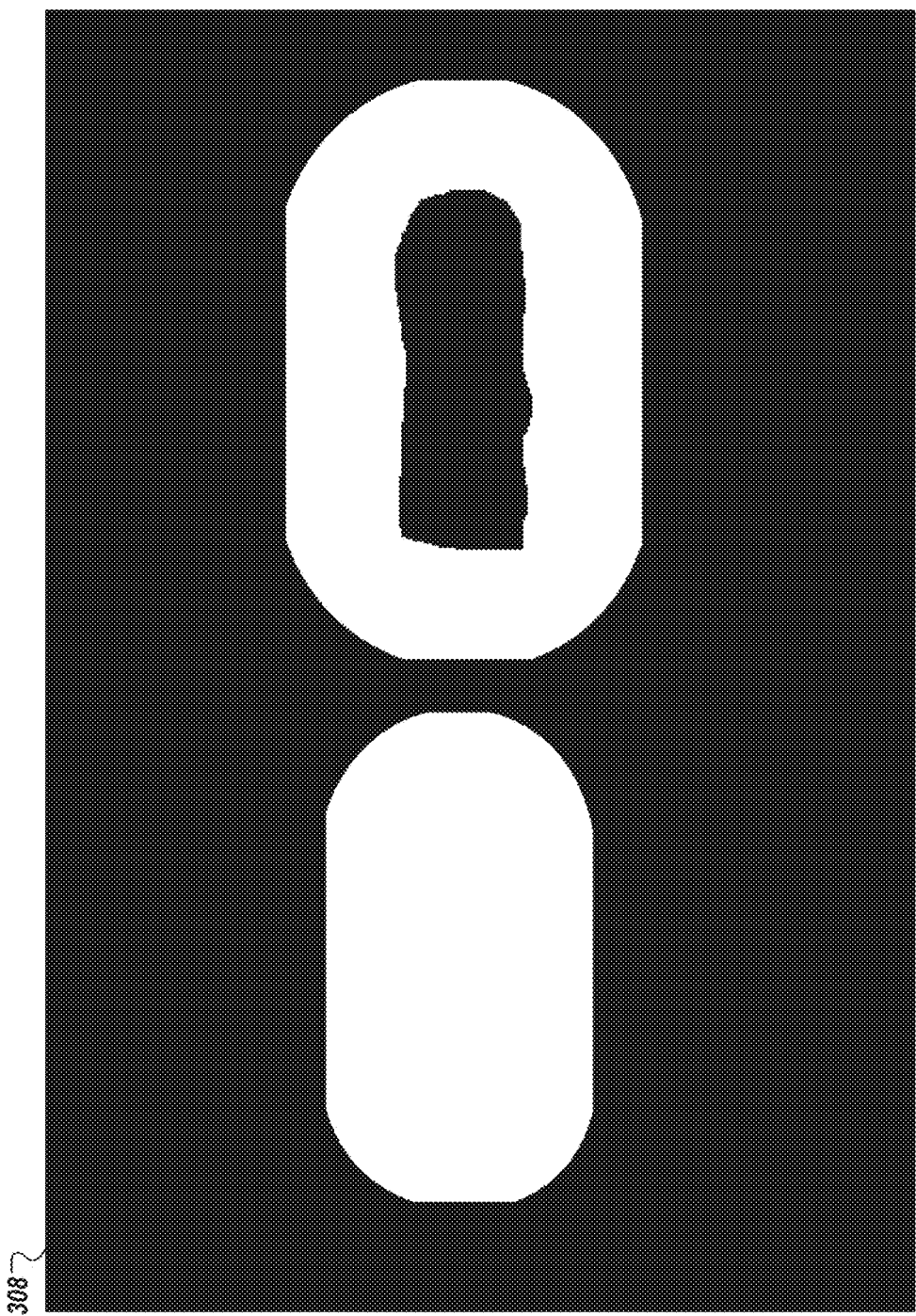

Once the user has finalized the second location 307, the synthesis area may be set at the first location 306 and source content can be drawn from one or more source areas of a different size and/or shape than the synthesis area. FIG. 3D shows a source mask 308 for the image 300. The source mask 308 may be created and maintained separately from the image 300, may be layered in the same image file as the image 300, or may be a schematic representation of a data structure that is never shown to a user. Generally, the source mask 308 here has two white sections and two black sections. The white sections indicate the source areas in the image from which content can be taken to replace the cars.

The shape of the source area here includes an area around the synthesis area but excludes the synthesis area itself. In some implementations, a source-adaptation variable may be set, and the source area may be dilated or contracted according to the source-adaptation variable. In some implementations, the source-adaptation variable may have the same possible values as the synthesize-adaptation variable and may affect the source area in the same way or ways that the synthesize-adaptation variable affects the synthesis area. In some implementations, the synthesize-adaptation variable and the source-adaptation variable may be the same variable and/or have the same value set.

Figure 3E:

FIG. 3E shows an example updated image 310 created from the example image 300 in FIG. 3A. Here, additional contents for the synthesis area, as shown by the synthesis mask 302 (FIG. 3B), have been identified, within the source area, as shown by the source mask 308 (FIG. 3D), using a patch-based optimization algorithm.

FIGS. 4A-E show an example of image modifications with an extend tool, such as may be provided by the GUI 200 (FIG. 2). With this tool, a user can select visible content to be extended and then drag or otherwise move the selection to a desirable location. While dragging the selection, the user can see within the synthesis area how the current content of the source area dynamically replaces the synthesis area. Once the user chooses a location for the selected visible content, a patch-based optimization algorithm can identify contents for the synthesis area from within the source area.

Figure 4A:
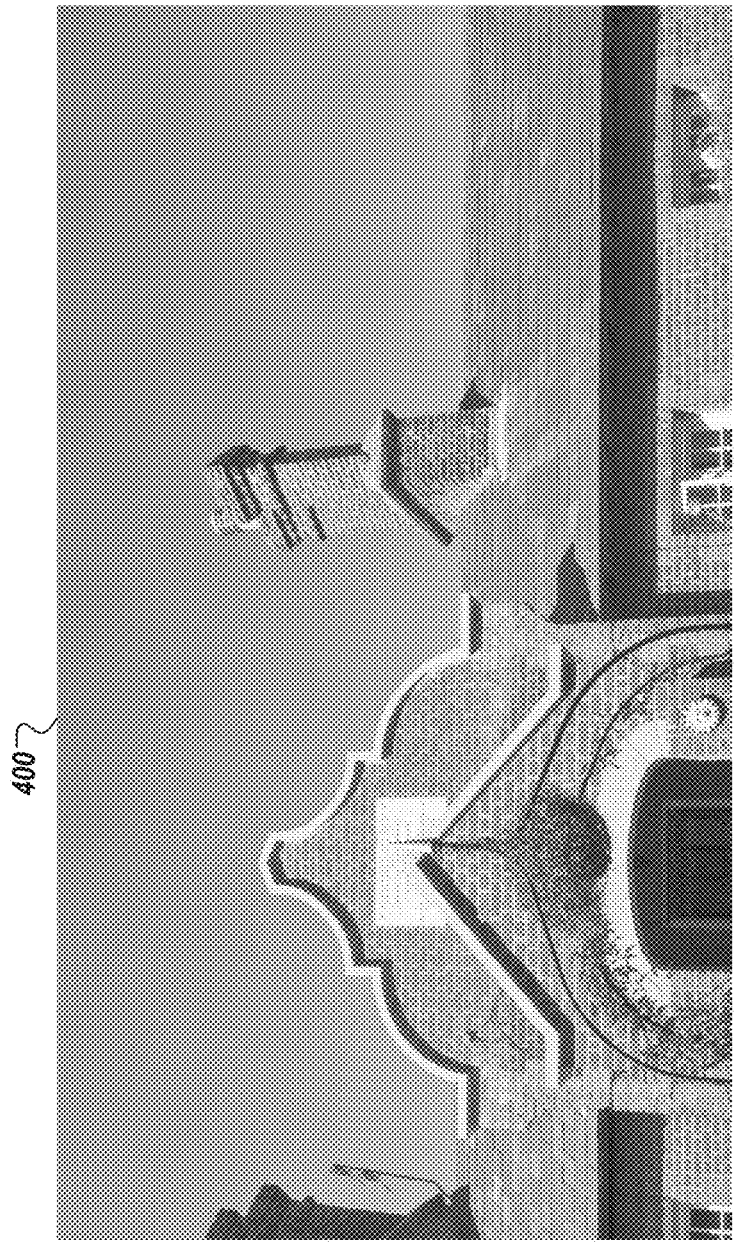
FIGS. 4A-E show examples of image modifications with an extend tool.

FIG. 4A shows an example image 400 to be modified. The image 400 shows a building with a chimney on the roof. In this example, the user wishes to extend the length of the chimney. The user can select the chimney by, for example, drawing an outline around the chimney. The user can then drag or otherwise move the selection to a second location. This input by the user creates a synthesis mask for the image 400 that identifies a synthesis area in the image 400.

Figure 4B:
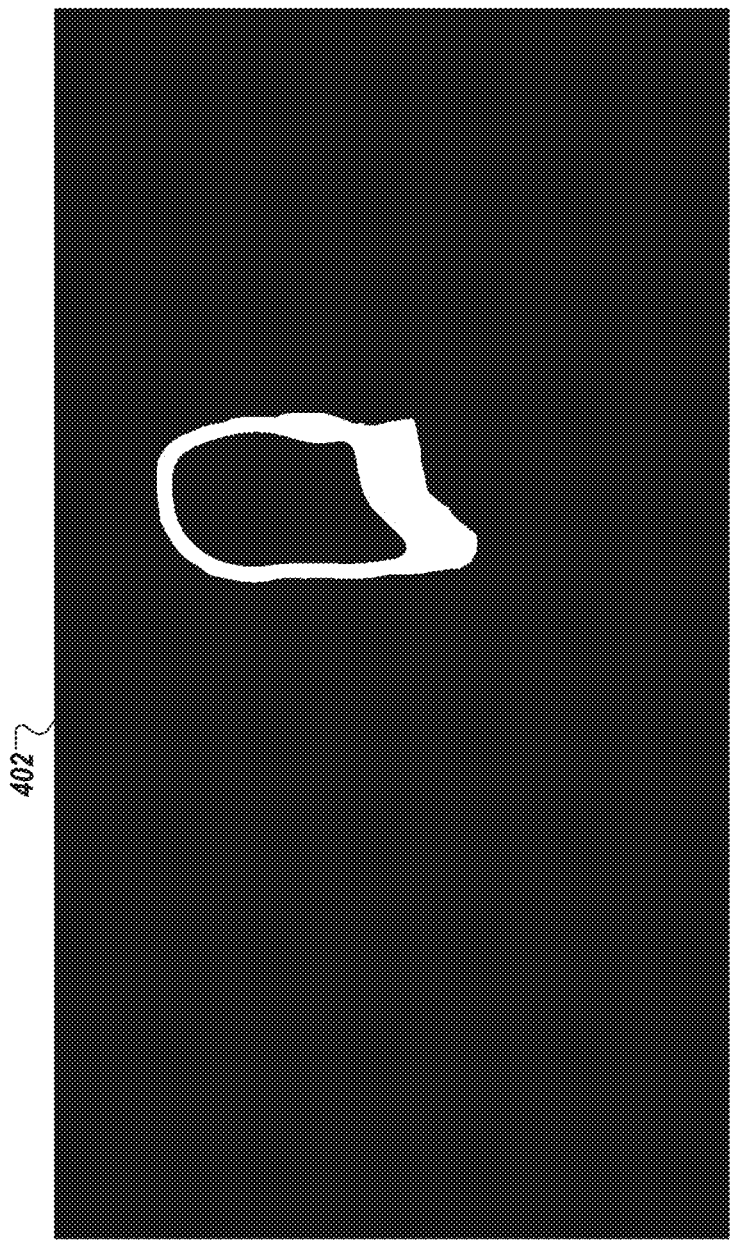

FIG. 4B shows a synthesis mask 402 for the image 400. The synthesis mask 402 may be created and maintained separately from the image 300, may be layered in the same image file as the image 300, or may a schematic representation of a data structure that is never shown to a user. Generally, the synthesis mask 402 here has a white section and two black sections. The white section corresponds to a synthesis area in the image 400 to which content should be added to partially or entirely synthesize the hole created by moving the chimney from that area.

The shape of the synthesis area can be created based on the shape of the selection of the chimney, the first location of the chimney before the movement, and the second location of the chimney after the movement. The synthesis area can include the union of the first location and the second location if they overlap, and the second location if they do not overlap. An internal region of the second location can be removed from the synthesis area.

In some implementations, the shape of the synthesis area can differ somewhat or substantially from the user's selection. For example, the size of the internal region may be defined, for example, based on a synthesize-adaption variable. This synthesize-adaption variable may have the same possible values as the synthesize-adaptation variable discussed with respect to FIGS. 3A-E, and may affect the internal region in the same way or ways that the synthesize-adaptation variable of FIGS. 3A-E affects the synthesis area of FIG. 3.

In this example, the user drags the selection from the first location (e.g., from where it surrounds the original location of the chimney) to a second location (e.g., to the desired new location of the chimney). This placement indicates where the chimney will extend to. In this example, the user wishes to make the chimney taller and therefore drags the selection essentially upward in the image from its original location.

Figure 4C:
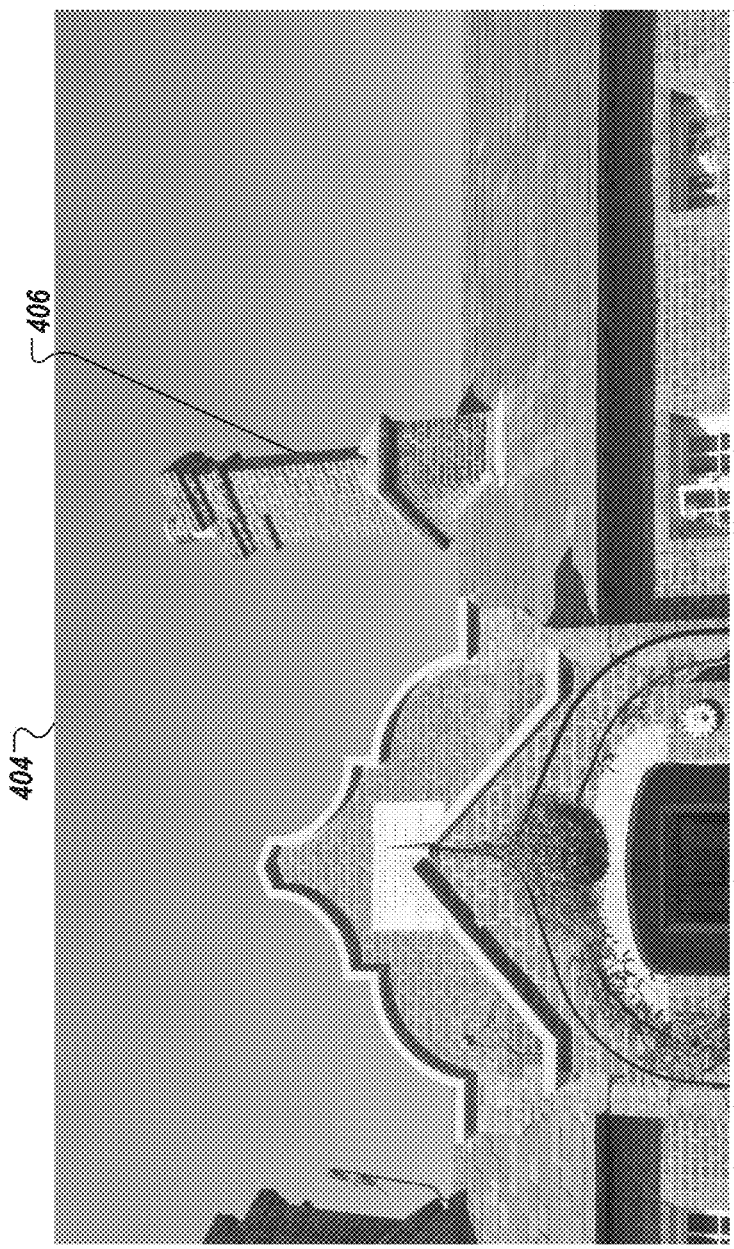

In response, a source area based on the second location is identified and content from the source area is dynamically placed in the synthesis area. FIG. 4C shows an example image 404 with initial content 406 from the source area. That is, the chimney here extends further above the ridge of the roof. The initial content 406 can show to the user a first guess at the content that may synthesize the synthesis area, enabling the user to see an updated layout of the contents of the image 400. If the user were to move the selection around the image, this would cause the source area to move with the selection and the synthesis area to be updated accordingly. That is, the content can change depending on the current location source area. In some implementations, the synthesis area is updated in real time when the source area is moved.

Figure 4D:
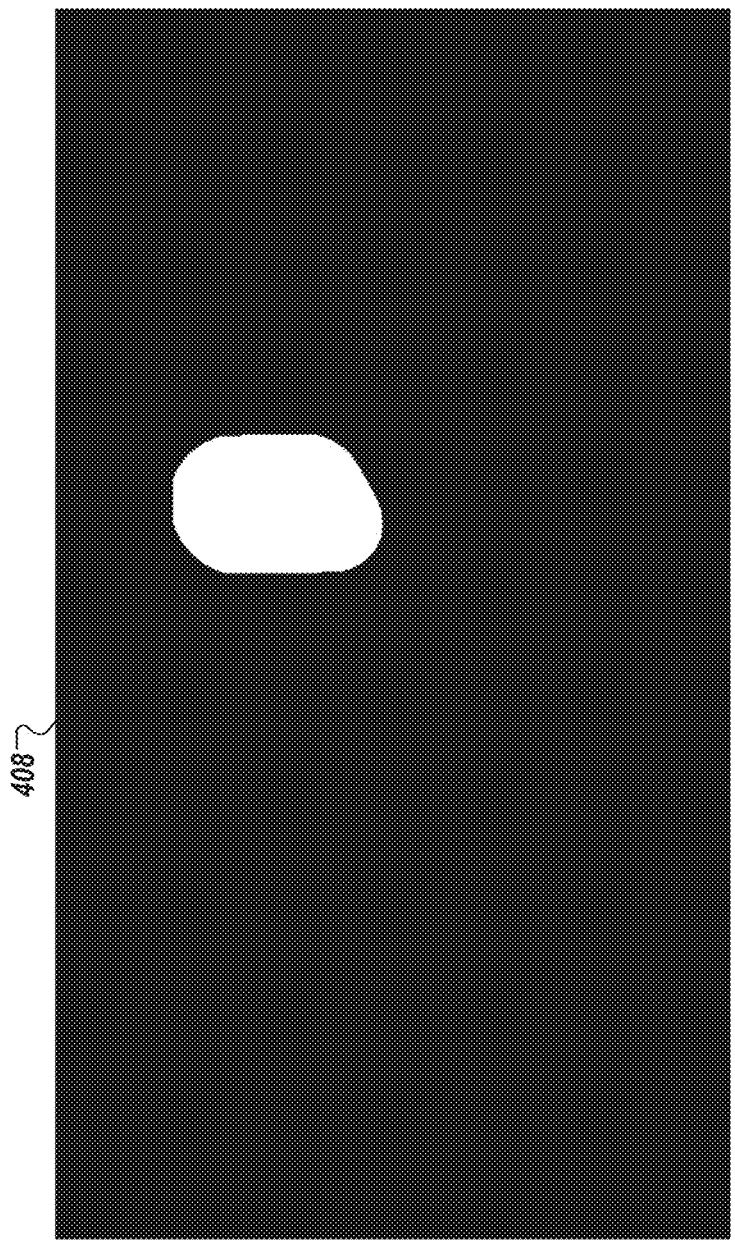

FIG. 4D shows a source mask 408 for the image 400. The source mask 408 may be created and maintained separately from the image 400, may be layered in the same image file as the image 400, or may be a schematic representation of a data structure that is never shown to a user. Generally, the source mask 408 here has a white section and a black section. The white section indicates the source area in the image from which content can be taken to extend the chimney.

The shape of the source area can include the shape of the user selection. In some implementations, a source-adaptation variable may be set, and the source area may be dilated or contracted according to the source-adaptation variable. This source-adaptation variable may have the same possible values as the source-adaptation variable discussed with respect to FIGS. 3A-E, and may affect the source area in the same way or ways that the source-adaptation variable of FIGS. 3A-E. In some implementations, the synthesize-adaptation variable and the source-adaptation variable discussed in this example may be the same variable and/or have the same value set.

Figure 4E:
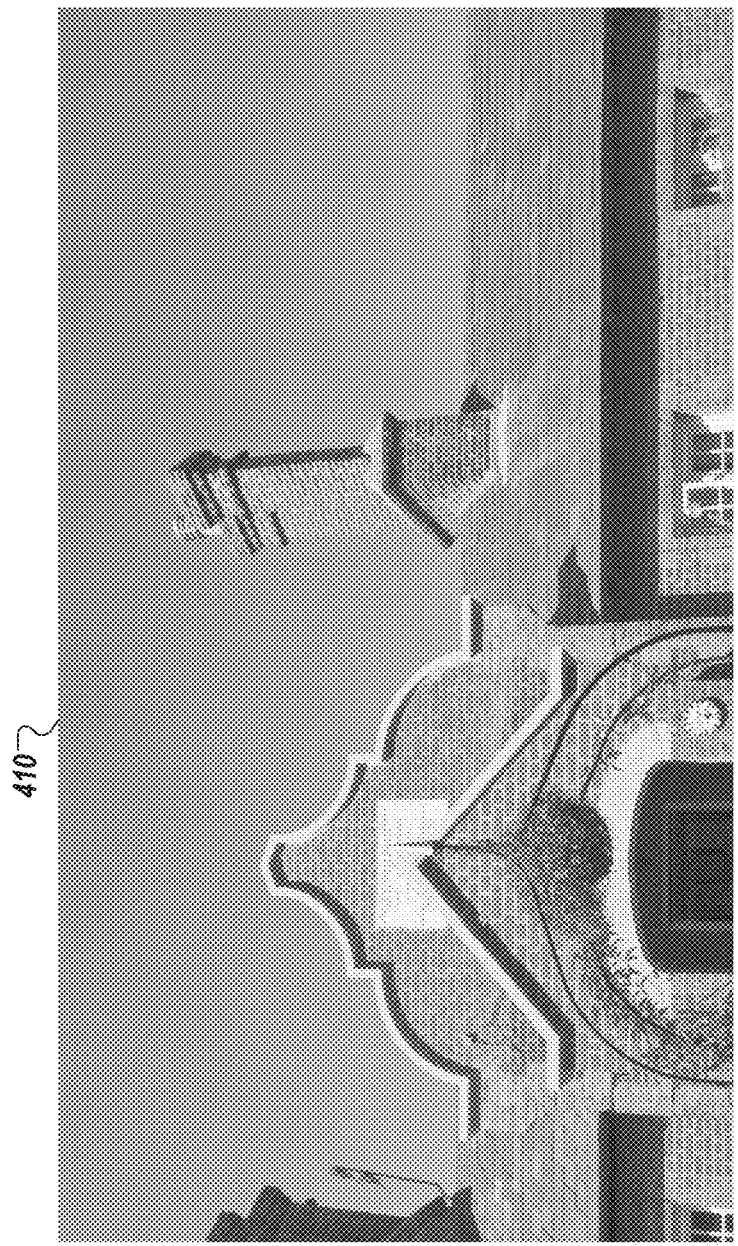

FIG. 4E shows an example updated image 310 created from the example image 400 in FIG. 4A. Here, a patch-based optimization algorithm has been performed on the example image, where the patch-based optimization algorithm has identified additional contents for the synthesis area, as shown by the synthesis mask 402, within the source area, as shown by the source mask 408.

FIGS. 5A-H show an example of image modification with a move tool, such as may be provided by the GUI 200 (FIG. 2). With this tool, a user can select visible content to be moved and drag the selection to a desired location. While dragging, the user sees the content moving according to the user's input. Once the user selects the second location, a patch-based optimization algorithm can identify contents for the synthesis area from within the source area.

Figure 5A:
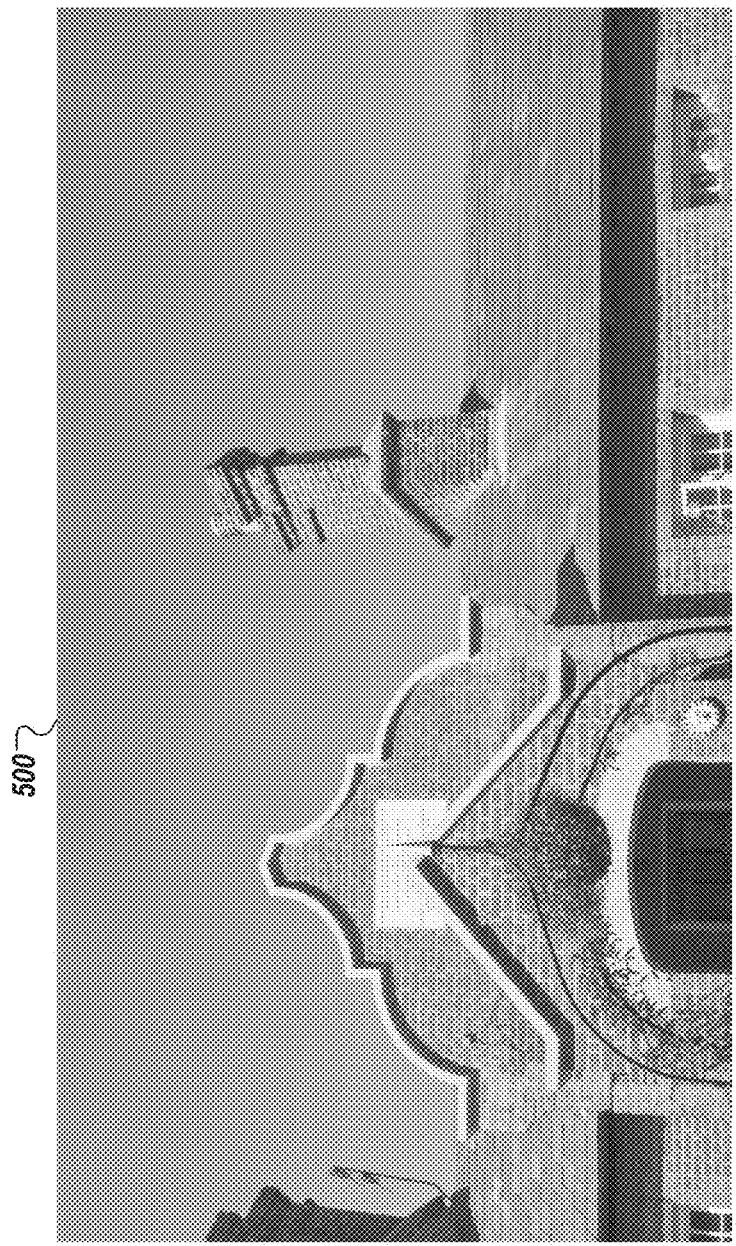
FIGS. 5A-H show examples of image modifications with a move tool.

FIG. 5A shows an example image 500 to be modified. The image 500 shows a building with a chimney on the roof. In this example the user wishes to relocate the chimney. The user can select the chimney by, for example, drawing an outline around the chimney and dragging the selection to a second location. This user input creates a synthesis mask for the image 500 that identifies a synthesis area in the image 300.

Figure 5B:
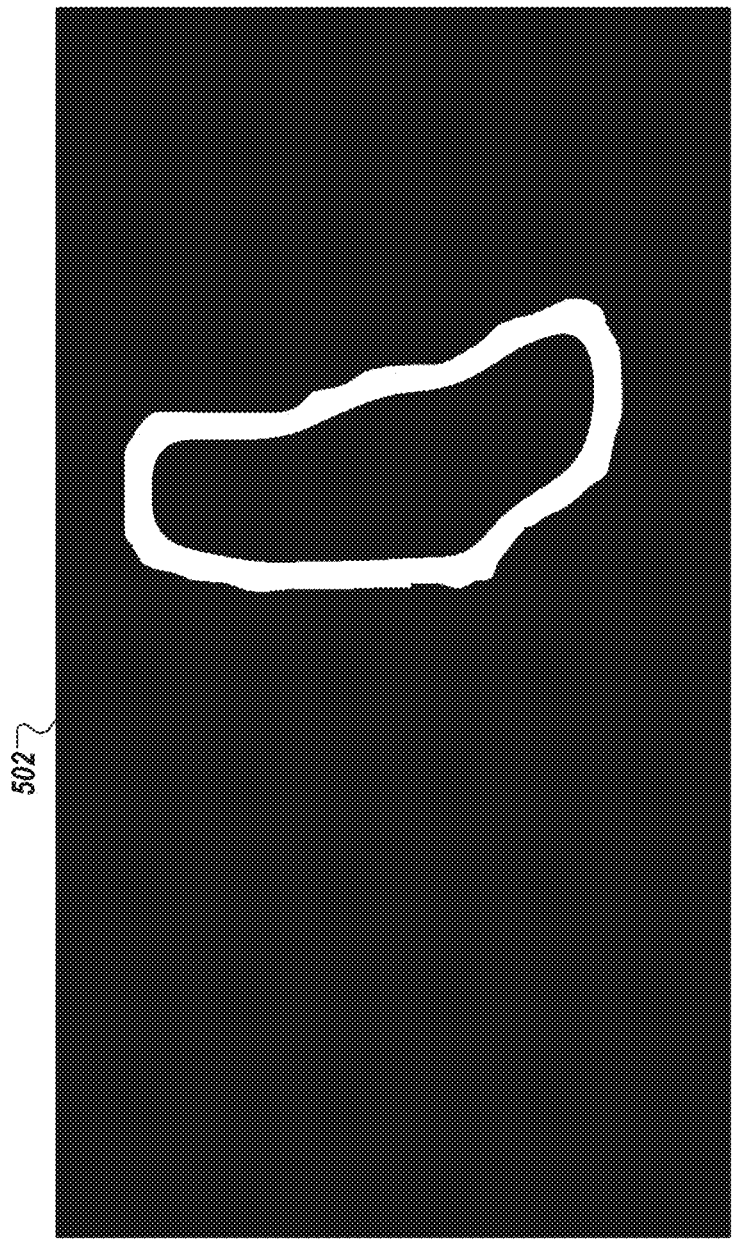

FIG. 5B shows a synthesis mask 502 for the image 500. The synthesis mask 502 may be created and maintained separately from the image 500, may be layered in the same image file as the image 500, or may be a schematic representation of a data structure that is never shown to a user. Generally, the synthesis mask 502 here has a white section and two black sections. The white section corresponds to a synthesis area in the image 500 to which content should be added to partially or entirely synthesize the hole created by moving the chimney from that area.

The shape of the synthesis area can be created based on the shape of the selection of the chimney and the first location of the chimney. An internal region of the synthesis area can be identified, optionally eroded, and removed.

In some implementations, the shape of the synthesis area can differ somewhat or substantially from the user's selection. For example, the size of the internal region may be defined, for example, based on a synthesize-adaptation variable. This synthesize-adaptation variable may have the same possible values as the synthesize-adaptation variables discussed with respect to FIGS. 3 and 4, and may affect the internal region in the same way or ways that the synthesize-adaptation variable of FIGS. 3A-E affects the synthesis area of FIG. 3 and/or the way or ways that the synthesize-adaptation variable affects the internal region of FIGS. 4A-E.

Figure 5C:
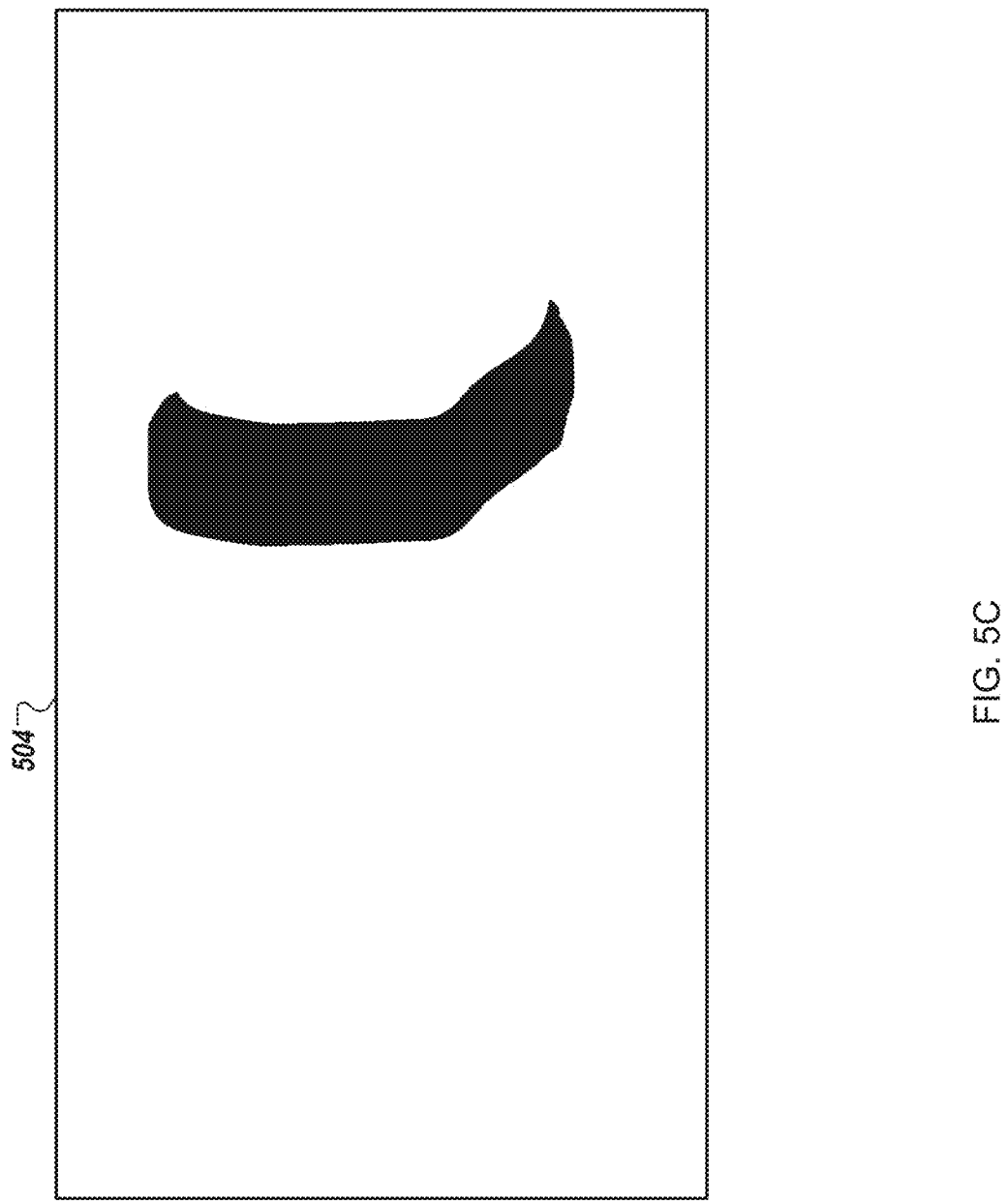

FIG. 5C shows a target mask 504 for the image 500. The target mask 504 may be created and maintained separately from the image 500, may be layered in the same image file as the image 500, or may be a schematic representation of a data structure that is never shown to the user. The white section indicates a portion of the source region that is not in the synthesis area and is thus invalid. In some implementation, the target mask identifies area of an image that is not to be used as boundary conditions.

Figure 5D:
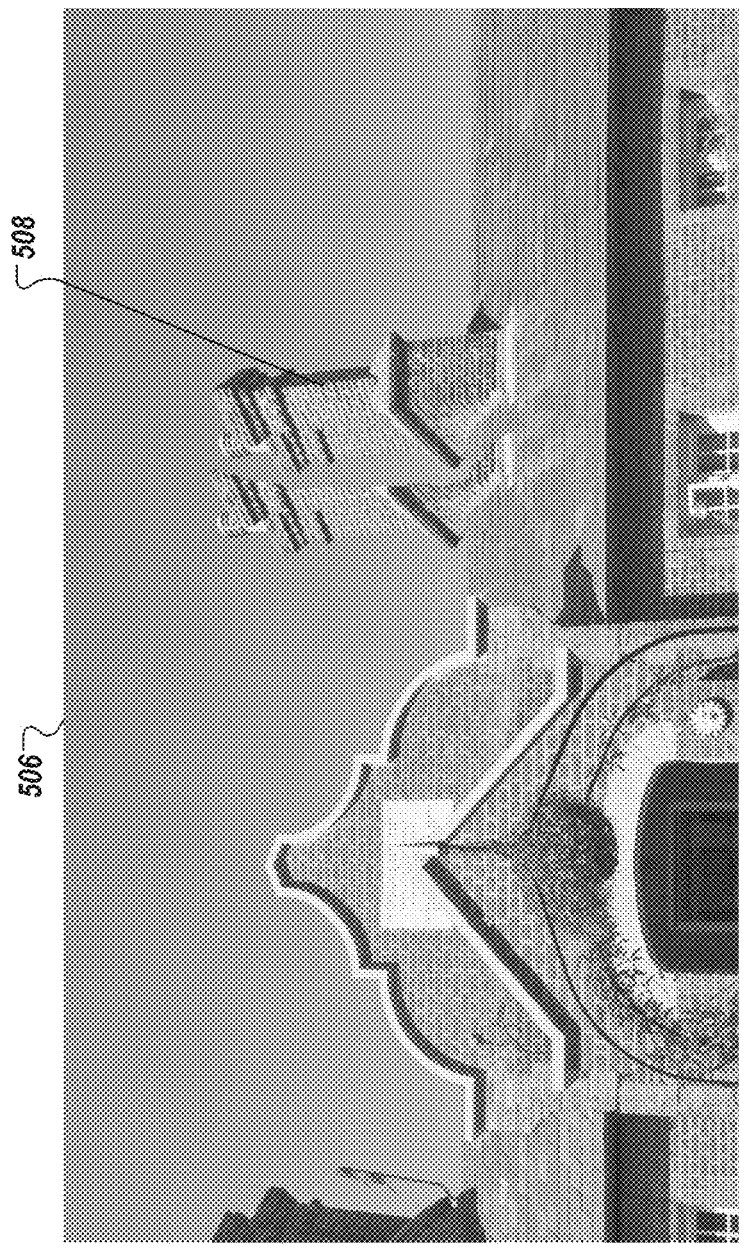

In this example, the user drags the selection from the first location (e.g., around the original location of the chimney) to a second location (e.g., the new location of the chimney). This placement indicates where the chimney will be repositioned to. In response, the chimney is shown in the new location, and a portion of the surrounding content is shown overlapping the old location of the chimney. FIG. 5D shows an example image 506 with initial content 508. The initial content 508 can show to the user a location of the selection, enabling the user to see an updated layout of the contents of the image 500.

Figure 5E:
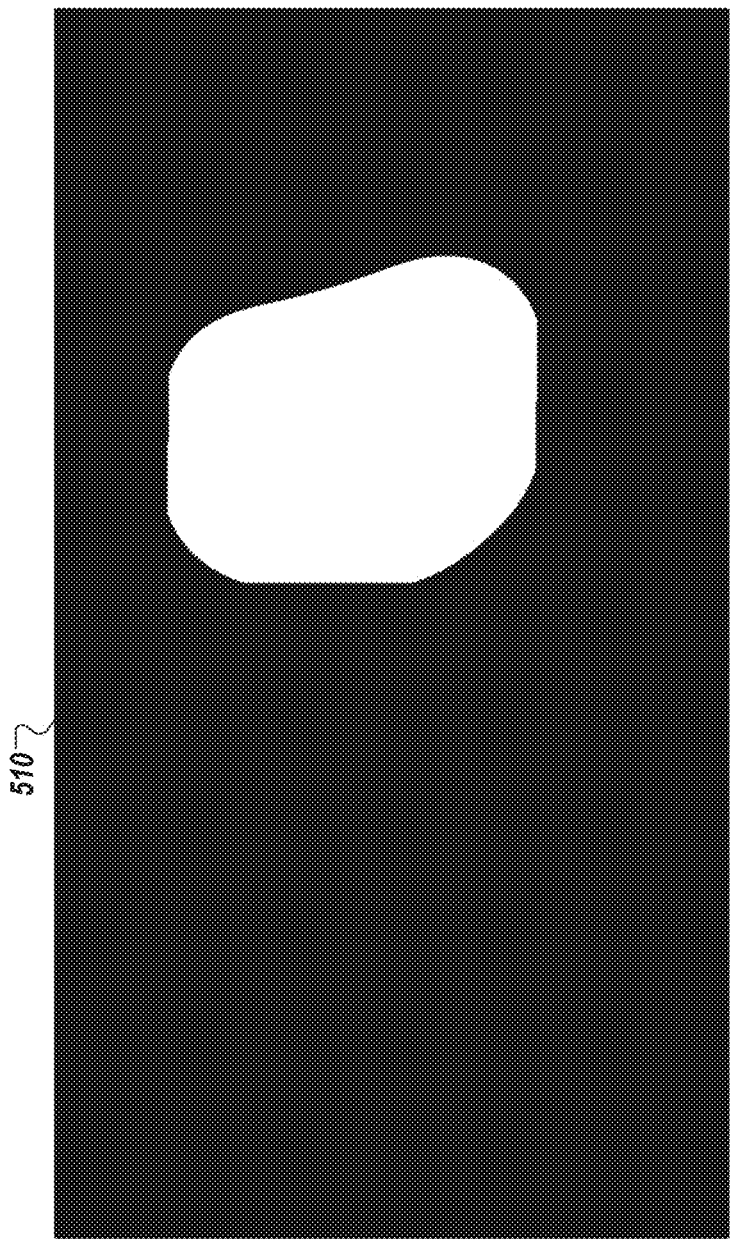

FIG. 5E shows a source mask 510 for the image 500. The source mask 510 may be created and maintained separately from the image 500, may be layered in the same image file as the image 500, or may be a schematic representation of a data structure that is never shown to a user. The white section indicates the source area in the image from which content can be taken to replace the original chimney.

The shape of the source area can include the shape of the user selection. In some implementations, a source-adaptation variable may have the same possible values as the source-adaptation variables discussed with respect to FIGS. 3 and 4, and may affect the source area in the same way or ways that the source-adaptation variables of FIG. 3 affects the source area of FIG. 3 and/or the way or ways that the source-adaptation variable of FIG. 4 affects the source region of FIG. 4.

Figure 5F:
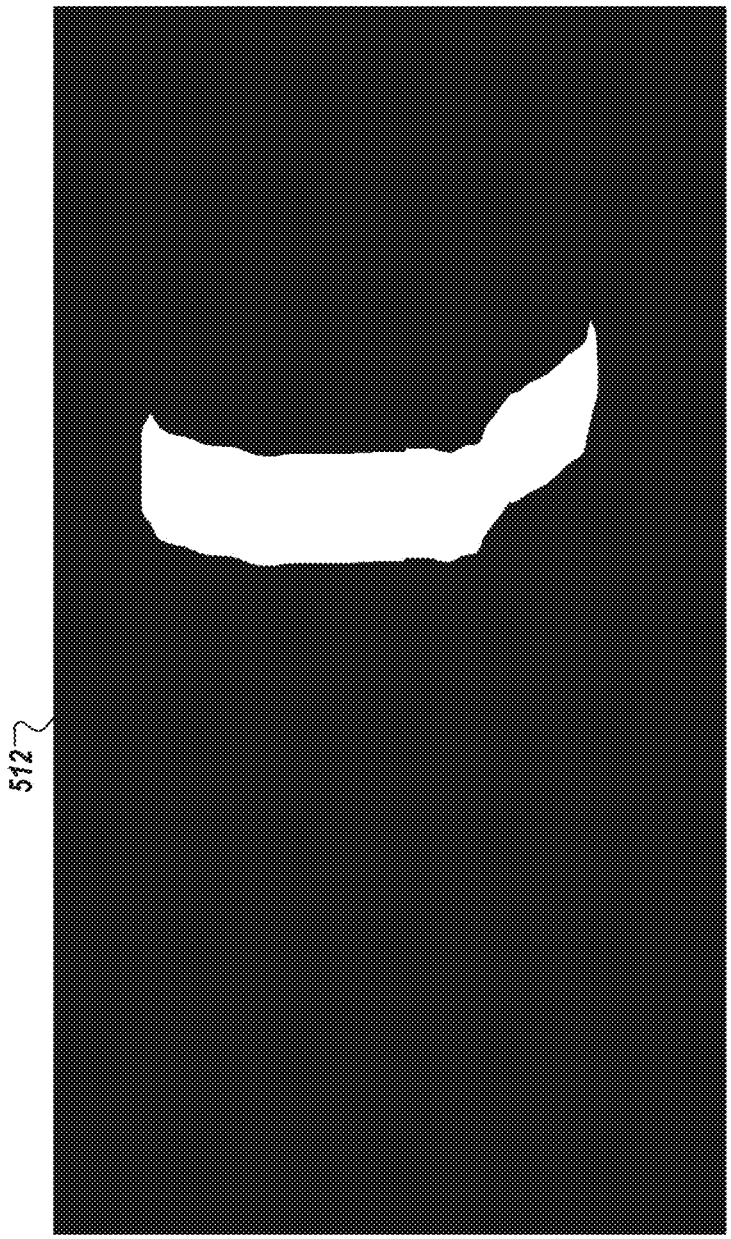

FIG. 5F shows an updated synthesis mask 512 for the image. The updated synthesis mask 512 may be created and maintained separately from the image 500, may be layered in the same image file as the image 500, or may be a schematic representation of a data structure that is never shown to a user. The white section indicates the synthesis area in the image to which content should be added to move the chimney. The shape of the synthesis area in the updated synthesis mask 512 can include a portion of the synthesize region that is not in the source region.

Figure 5G:
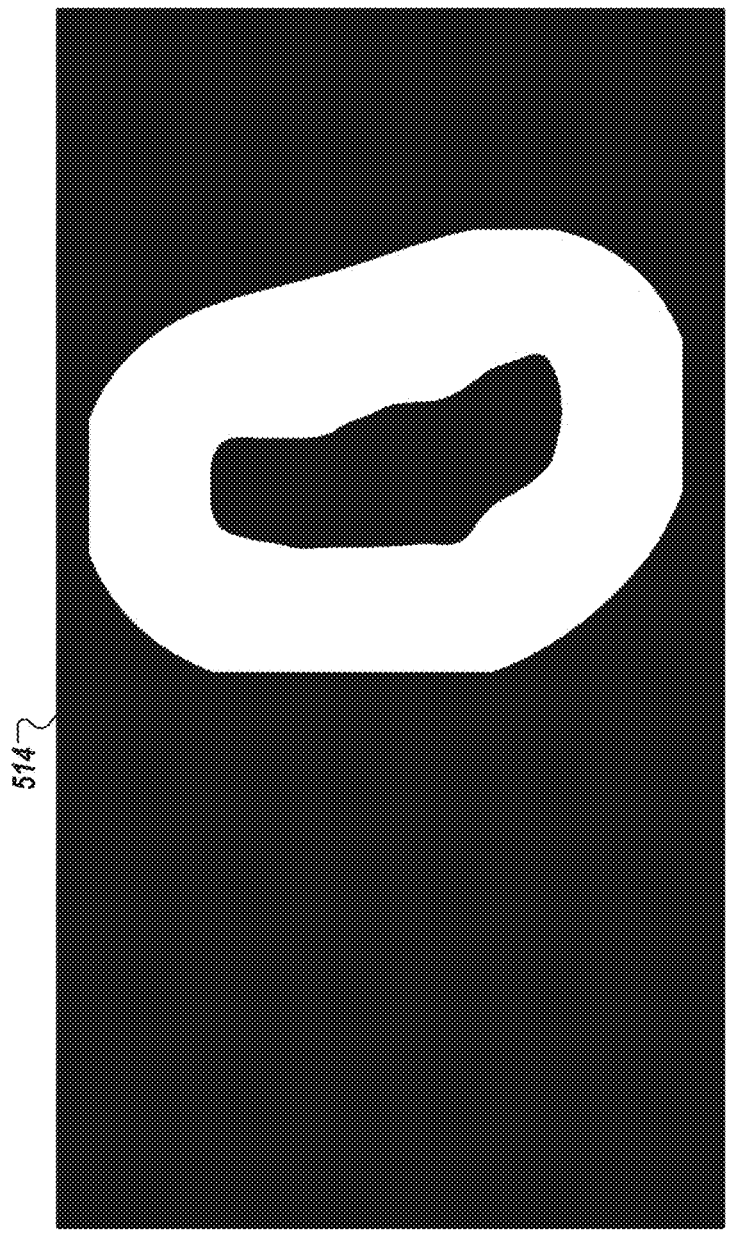

FIG. 5G shows an updated source mask 514 for the image 500. The source mask 514 may be created and maintained separately from the image 500, may be layered in the same image file as the image 500, or may be a schematic representation of a data structure that is never shown to a user. The white section indicates to the source area in the image from which content can be taken to move the chimney.

The shape of the source area can include the shape of the original source mask of FIG. 5E, which may have been dilated, either according to a variable such as a source-adaptation variable, a constant factor, or other amount. From the source area, the synthesis area is removed, optionally after being eroded.

Figure 5H:
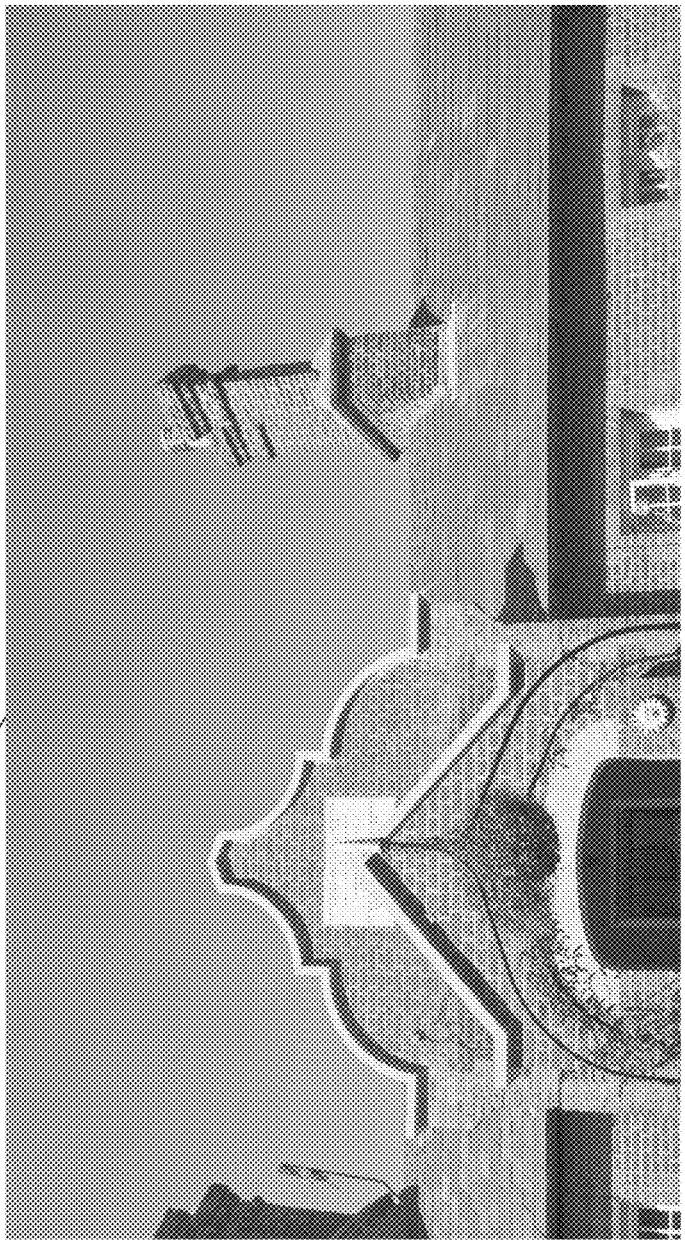

FIG. 5H shows an example updated image 516 created from the example image in FIG. 5A. Here, a patch-based optimization algorithm has been performed on the example image 500, where the patch-based optimization algorithm has identified additional contents for the synthesis area, as shown by the updated synthesis mask 512, within the source area, as shown by the updated source mask 514.

FIG. 6 shows an example system 600 that can generate an updated image. The system 600 includes a computer device 602, which can be any processor-based device including, but not limited to, a personal computer, a server device, a workstation or a handheld device.

An electronic image (which for brevity will simply be referred to as an image) may, but need not, correspond to a file. An image may be stored in a portion of a file that holds other documents, in a single file dedicated to the document in question, or in multiple coordinated files.

The system 600 includes a GUI 604 that here is generated by the computer device 602. For example, the GUI 604 can be displayed on a display device 606 connected to or integrated in the computer device. The GUI 604 is for example used in the manipulation if images, such as to show a user an initial image and/or an updated image.

The system 600 includes at least one repository 608, which can be implemented using any technology suitable for storing data, such as in form of a memory, a hard drive, or an optical disk, to name a few examples. The repository 608 can contain one or more images, for example images that have not been modified and/or updated images. The system 600 can make one or more images in the repository 608 available to a user, for example by displaying the image(s) in the GUI 604.

The system 600 includes at least one input device 610, such as a keyboard, mouse, pointing device, trackball, joystick, track pad, or any other device with which a user can control and/or respond to the computer device 602. The user can make one or more inputs to affect image processing, such as to apply one or more constraints for the modification.

The system 600 can be used for any of a number of purposes, such as for modifying an image by performing synthesis in an image, which will be described as an illustrative example below. Other applications include, but are not limited to, modifying a photograph to add image content corresponding to structure that is missing in the physical object that is the subject of the photograph. Generally, the modification involves adding information in an area of the initial image selected from one or more other areas of the image. Here, these and other operations are performed by an image editor component 612 that can be implemented using processor-executed instructions stored in a computer readable storage device, such as in a memory or on a disk. The image editor component 612 can generate output for display in the GUI 604, such as an image display area 614 and an input control area 616.

An image modification process can be performed using patch-based optimization subject to at least a coherence criterion. In one example patch-based optimization, the unknown contents of a hole in a video sequence can be synthesized. In this optimization, a pixel (x,y) in a video frame t is denoted at a space-time point p=(x, y, t). $W_p$ can be used to denote a small, fixed-sized window around the point p both in space and time. Indices i and j can denote locations relative top. The video sequence, denoted as S, may have a measured global visual coherence with some other sequence D if every local space-time patch in S can be found somewhere within the sequence D. Windows in the data set D may be denoted by V and may be indexed by a reference pixel (e.g. $V_q$ and $V_q^i$). S and H⊆S may be an input sequence and a hole region within the input sequence. H may denote all the missing space-time points within S. For example, H may be an undesired object to be erased, a corruption, or a missing frame.

In this patch-based optimization, H is to be replaced with new data H* such that, for example, the resulting video sequence S* will have as much global visual coherence with some reference sequence D. Pseudo-code to perform this patch-based optimization is listed below:

1. Input: video S, hole H ⊂ S, database D.
2. Compute space-time pyramids $S_l$, $H_l$, $D_l$, l = 1..L.
3. t ← 0, $S^t$ ← S
4. for pyramid level l, from top to bottom do
5.  repeat
6.   for all p ∈ $H_l$ do
7.    Let $\{W_p^i\}_{i=1}^k$ be all windows s.t. p ∈ $W_p^i$
8.    Find $\{V^i\} \subseteq D_l$ maximizing sim($W_p$, $V_q$) = $e\hat{}$ −(d($W_p$, $V_q$) / $2n^2$)
9.    Let $c^i \in V^i$ be the appropriate colors.
10.   Set wip = aip · sim(Wip, Vi).
11.   $S^{t+1}$(p) ← ML(ci, wip)using c = (ΣiϵMwipci)/( ΣiϵMwip)
12.  end for
13.  t ← t +1
14. until convergence
15. Propagate solution to the next level
16. end for Another patch-based optimization algorithm uses the hash value of patches to identify near-neighbor patches. In this algorithm, a family H of hashing function and an approximate nearest neighbor search algorithm can be used. In an indexing stage, the hash functions in H can be used to create an index in which similar points of an image map into the same hash bins with high probability. N primitive hash functions can be concatenated to create a code which may have the property of amplifying the gap between collision probabilities of faraway points and the collision probabilities of nearby points. These codes may be used to create a single hash table by evaluating on all data-set points.

In a search stage following the index stage, a query point can be hashed into a table bin, from which the nearest of residing data-set points is chosen. In some cases, multiple (L) random codes can be used to create L hash tables to be searched sequentially at search stage. The use of L tables may, in some implementations, reduce the probability of a query point falling into an empty bin. An example indexing and an example search function are described below:

Indexing Function

Input: color images A and B

Output: a dense nearest patch map M that, for each patch of color image A, identifies an approximate nearest neighbor patch in color image B.

1. Compute the projection of each of the patches in A and B on M Walsh-Hadamard kernels: $\{WH_j\}_{j=1}^{M}$, using, for example, the Gray Code Kernels technique.
2. Create L hash tables $\{T_i\}_{i=1}^{L}$. Table $T_i$ may be constructed by:
    a. Define a code $g_i(p)=h_1(p)$ o ... o $h_M(p)$ which may be a concatenation of M functions $\{h_j\}_{j=1}^{M}$ of the form $h_j(p)=(WH_j \cdot p+b_j)/(r)$ where r is a predetermined value and $b_j$ is drawn uniformly at random from an interval [0,r).
    b. Then, each patch p (of both A and B) may be stored in the entry $T_i[g_i(p)]$.

Search Function

1. Arbitrarily initialize the best candidate map M
2. Repeat for i=1 . . . L (for each hash table)
    a. For each patch a in A
        i. Create a set of candidate nearest patches $P_B$ using the table $T_i$ and the current mapping M.
        ii. Let b be the patch from $P_B$ which is most similar to a.
        iii. If dist(a,b)<dist(a,M(a)) then update: M(a)=b (distance may be approximated)
3. Return M Described below is a patch-based optimization algorithm that takes into account user-defined source and synthesis areas:

(i) The updated image can be initialized with a user input that includes a user movement for a visible feature from a first location to a second location.

(ii) In some implementations, a multi-scale algorithm is used. In such an algorithm, the contents of a hole in the source image are first synthesized using a coarsest scale and then interpolated to a finer scale in one or more iterations. For example, a Gaussian pyramid can be used where the finest scale corresponds to the scale of the source image. The scale of the multi-scale algorithm may be set according to an adaptation variable value, which may be user-set. For example, the adaptation variable may have multiple alternative states to choose between. Examples of this adaptation variable will be discussed below with respect to FIGS. 3-5.

(iii) In some implementations, a nearest-neighbor process using iteratively repeated steps of propagation and random search can be performed. For example, when the user moves a visible feature from a first to a second location, the nearest-neighbor process can be performed under at least one constraint based on the second location.

(iv) In some implementations, color votes can be assigned to each pixel according to the nearest neighbors of all its overlapping patches. The color votes can be averaged, or clustered, and the largest cluster or mode can be chosen to obtain a new color.

(v) In some implementations, (ii)-(iv) can be repeated to improve the results for a fix number of iterations, or until the image changes less than a predefined amount, or based on another termination criterion.

(vi) In some implementations, (ii)-(v) can be repeated as part of the multi-scale algorithm.

The iterations are halted when a criterion is met. In some implementations, the criterion is whether the fraction of modified offsets falls below a threshold. In some implementations, a fixed number of iterations is used, for example five. Performing the patch-based optimization generates the updated image so that it corresponds to the initial image. For example, the updated image can be a version of the initial image where the contents of an image hole have been synthesized, or where content has been selectively added to a feature. The intermediate image generated as described above will be an improved estimate over the initial guess, but may not satisfactorily solve the image completion problem. The entire process is therefore repeated iteratively, using the iterative offset optimization in the inner loop, to compute a high quality final solution.

In some implementations, a unidirectional similarity measure can be used, for example one that finds good correspondences between image regions in one directions (e.g., from a patch in the initial image to a patch in the updated image, or vice versa). For example, if the image regions are sufficiently similar, an existing unidirectional similarity method can converge to a partially continuous solution, with many salient regions copied to the output with minimal distortions. For example, most offsets of nearby patches in the source image may be nearly identical. As another example, if the image regions are not particularly similar, then the true unidirectional similarity may likely be close to a similarity of random patches within the images.

In some implementations, the unidirectional similarity algorithm can include at least the following operations. In a coherence step, the algorithm seeks a nearest-neighbor patch in the source for every patch inside the hole. These searches generate nearest-neighbor votes between the source and target images. The votes are used to compute the color of each pixel inside the hole (for example, by averaging or clustering) in each inner loop iteration.

A patch-based optimization algorithm can use a coherence criterion that relates to whether all patches in the updated image originate from the initial image. That is, the image editor component 112 can seek to ensure with regard to the target image that every patch used to synthesize a hole therein is one that exists somewhere in the source area of the source image, so that the target image is coherent with the source image. For example, each patch in the updated image should have at least one corresponding patch in the initial image. In contrast, if a patch in the updated image lacks any corresponding patch in the initial image then the coherence criterion is not satisfied. Coherence in the updated image can be obtained by processing at multiple scales so that eventually local coherence at multiple scales gives a globally coherent and natural-looking output in the target image.

A nearest-neighbor algorithm can be performed iteratively in an inner loop of a bidirectional or unidirectional similarity algorithm, for example to perform retargeting.

Examples of bidirectional similarity calculations are described here. Two signals S and T may be considered visually similar" if patches of S (possibly at multiple scales) are contained in T and if patches of T are contained in S. The following formula may be used to calculate bidirectional symmetry. In the formula, S and T are two visual signals of the same type (e.g., images, videos). In the case of visual summarization or retargeting, S may be used as an input source signal, and T may be used as a target signal. S and T need not be of the same size. P and Q may be used to denote patches in S and T, respectively. $N_s$ and $N_t$ may be used to denote the number of patches in S and T, respectively.

Visual dissimilarity can be found with Equation 1 below:

$$d(S, T) = \frac{1}{N_s} \sum_{P \subset S} \min_{Q \subset T} D(P, Q) + \frac{1}{N_T} \sum_{Q \subset T} \min_{P \subset S} D(Q, P)$$

For each patch $Q \subset T$, the most similar patch $P \subset S$ can be found and the distance $D(,)$, can be measured, and vice-versa. The patches may be taken around every pixel and at multiple scales, which can result in patch overlap. The spatial (or spatio-temporal) geometric relations can be implicitly captured by treating images (or videos) as unordered sets of all their overlapping patches. The distance $D(,)$ in Equation 1 may be used as a distance measure between any two patches.

Different relative weights of the two terms of the equation in Equation 1, depending, for example, on the application, in Equation 2 below:

$$d(S,T) = \alpha \cdot d_{complete}(S,T) + (1-\alpha) \cdot d_{cohere}(S,T)$$

In order to capture bi-directional similarity locally and globally, the completeness and coherence terms may be computed at multiple scales. The two terms in Equation 1 above have complementary roles. The first term, referred to here as $d_{complete}(S,T)$, measures the deviation of the target T from completeness with respect to S. The second term, refereed to here as $d_{cohere}(S,T)$, measures the deviation of the target T from coherence with respect to S.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

What is claimed is:

1. A computer-implemented method for modifying an image, the method comprising:
   receiving, by a computing device, a first input comprising a selection of a region of content from a first location in the image, the region of content containing a visual feature;
   receiving, by the computing device, a second input comprising a movement of the selection corresponding to the visual feature away from the first location;
   updating, by the computing device and during the movement of the selection, the region in the first location of the image based on content from where the selection is currently located;
   receiving, by the computing device, a third input that specifies an end of the movement of the selection at a second location in the image;
   identifying, by the computing device, additional content for the first location based at least in part upon the second location and an area around the first location; and
   updating, by the computing device, the image to have the additional content at least in the first location.

2. The method of claim 1, further comprising displaying, during the movement of the selection, the image including content in the first location that is from where the selection is currently located.

3. The method of claim 1, wherein updating the image comprises deleting the visual feature from the first location.

4. The method of claim 1, wherein the image is updated to have at least part of the additional content in the area around the first location.

5. The method of claim 1, wherein the region in the first location, after the second input is received, comprises a hole in the image and wherein the updated image is generated in a hole-synthesizing process.

6. The method of claim 1, further comprising generating a source mask for the image having (i) a first color for the second location and the area around the first location and (ii) a second color for the rest of the source mask.

7. The method of claim 1, wherein the additional content is identified using a patch based optimization algorithm on the image.

8. A non-transitory computer-readable medium have stored therein a program that, when executed by a computing device, configures the computing device to perform operations comprising:
   displaying an image on a display device;
   receiving a first input comprising a selection of a region of content from a first location in the image, the region of content containing a visual feature;
   receiving a second input comprising a movement of the selection corresponding to the visual feature away from the first location;
   updating, during the movement of the selection, the region in the first location of the image based on content from where the selection is currently located;
   receiving a third input that specifies an end of the movement of the selection at a second location in the image;
   identifying additional content for the first location based at least in part upon the second location and an area around the first location; and
   updating the image to have the additional content at least in the first location.

9. The non-transitory computer-readable medium of claim 8, wherein updating the image comprises deleting the visual feature from the first location.

10. The non-transitory computer-readable medium of claim 8, wherein the image is updated to have at least part of the additional content in the area around the first location.

11. The non-transitory computer-readable medium of claim 8, wherein the region in the first location, after the second input is received, comprises a hole in the image and wherein the updated image is generated in a hole-synthesizing process.

12. The non-transitory computer-readable medium of claim 8, wherein the additional content is identified using a patch-based optimization algorithm on the image.

13. A system, comprising:
   at least one computing device; and
   a non-transitory computer-readable medium communicatively coupled to the at least one computing device and having instructions stored thereupon that, when executed, cause the at least one computing device to:
      receive a first input comprising a selection of a region of content from a first location in the image, the region of content containing a visual feature;
      receive a second input comprising a movement of the selection corresponding to the visual feature away from the first location;

update, during the movement of the selection, the region in the first location of the image based on content from where the selection is currently located;

receive a third input that specifies an end of the movement of the selection at a second location in the image;

identify additional content for the first location based at least in part upon the second location and an area around the first location; and update the image to have the additional content at least in the first location.

14. The system of claim 13, wherein the instructions further cause the at least one computing device to display, during the movement of the selection, the image including content in the first location that is from where the selection is currently located.

15. The system of claim 13, wherein updating the image comprises deleting the visual feature from the first location.

16. The system of claim 13, wherein the image is updated to have at least part of the additional content in the area around the first location.

17. The system of claim 13, wherein the region in the first location, after the second input is received, comprises a hole in the image and wherein the updated image is generated in a hole-synthesizing process.

18. The system of claim 13, wherein the instructions further cause the at least one computing device to generate a source mask for the image having (i) a first color for the second location and the area around the first location and (ii) a second color for the rest of the source mask.

19. The system of claim 13, wherein the instructions further cause the at least one computing device to identify a synthesis area in the image that includes the region in the first location, the synthesis area identified based on a shape of the selection and an adaptation variable that defines a limit to which the synthesis area can differ from the selection.

20. The system of claim 13, wherein the additional content is identified using a patch-based optimization algorithm on the image.

* * * * *